(12) United States Patent
Gupta et al.

(10) Patent No.: US 9,417,069 B2
(45) Date of Patent: Aug. 16, 2016

(54) FAMILIARITY MODELING

(71) Applicant: HONDA MOTOR CO., LTD., Minato-ku, Tokyo (JP)

(72) Inventors: Rakesh Gupta, Mountain View, CA (US); Igor V. Karpov, Mountain View, CA (US); Antoine Raux, Cupertino, CA (US); Deepak Ramachandran, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 325 days.

(21) Appl. No.: 13/951,015

(22) Filed: Jul. 25, 2013

(65) Prior Publication Data

US 2015/0032424 A1    Jan. 29, 2015

(51) Int. Cl.
| | |
|---|---|
| G06F 7/60 | (2006.01) |
| G06F 17/10 | (2006.01) |
| G01C 21/00 | (2006.01) |
| G01C 21/34 | (2006.01) |
| G01C 21/36 | (2006.01) |
| G06N 99/00 | (2010.01) |

(52) U.S. Cl.
CPC ............ *G01C 21/00* (2013.01); *G01C 21/3484* (2013.01); *G01C 21/3641* (2013.01); *G06N 99/005* (2013.01)

(58) Field of Classification Search
CPC ................................. G01C 1/00; G06N 99/005
USPC ............................................................ 703/2
See application file for complete search history.

(56) References Cited

U.S. PATENT DOCUMENTS

| | | | |
|---|---|---|---|
| 5,528,501 | A  | 6/1996  | Hanson |
| 6,466,862 | B1 | 10/2002 | DeKock et al. |
| 6,574,548 | B2 | 6/2003  | DeKock et al. |
| 6,785,606 | B2 | 8/2004  | DeKock et al. |
| 6,865,481 | B2 | 3/2005  | Kawazoe et al. |
| 6,895,328 | B2 | 5/2005  | Manabe et al. |
| 6,961,658 | B2 | 11/2005 | Ohler |
| 7,092,818 | B2 | 8/2006  | Ohler |
| 7,197,394 | B2 | 3/2007  | Ohler |
| 7,333,889 | B2 | 2/2008  | Hashizume |
| 7,395,153 | B1 | 7/2008  | Nesbitt et al. |
| 7,400,973 | B2 | 7/2008  | Okochi |

(Continued)

OTHER PUBLICATIONS

Anati et al. (Constructing Topological Maps using Markov Random Fields and Loop-Closure Detection, 2009 (9 pages)).*

(Continued)

*Primary Examiner* — Kamini S Shah
*Assistant Examiner* — Andre Pierre Louis
(74) *Attorney, Agent, or Firm* — Arent Fox LLP

(57) ABSTRACT

One or more embodiments of techniques or systems for modeling familiarity for a traveler are provided herein. Familiarity evidence can be received, indicative of how familiar a traveler is with an area or road segment, and based on a number of visits the traveler has made to that area. The familiarity evidence can be used to generate one or more familiarity models indicative of a predicted familiarity of locations around the area. Familiarity models can be based on kernels, graph distances, Markov random fields (MRFs), etc. When route directions are generated from an origin location to a destination location, one or more of the directions can be provided based on one or more of the familiarity models. For example, if a familiarity model indicates that a traveler is familiar with a route, driving directions of the route can be adapted to be more succinct.

16 Claims, 8 Drawing Sheets

(56) References Cited

U.S. PATENT DOCUMENTS

| | | |
|---|---|---|
| 7,424,363 B2 | 9/2008 | Cheng et al. |
| 7,561,965 B1 | 7/2009 | Nesbitt et al. |
| 7,640,100 B2 | 12/2009 | Spinelli |
| 7,680,749 B1* | 3/2010 | Golding ............. G01C 21/3484 706/14 |
| 7,698,061 B2 | 4/2010 | Singh |
| 7,702,454 B2 | 4/2010 | Nesbitt |
| 7,840,319 B2 | 11/2010 | Zhong |
| 7,991,544 B2 | 8/2011 | Singh |
| 8,060,298 B2 | 11/2011 | Cheung et al. |
| 8,155,877 B2 | 4/2012 | Baudisch et al. |
| 2004/0267440 A1 | 12/2004 | DeKock et al. |
| 2006/0041378 A1* | 2/2006 | Cheng ................ G01C 21/3641 701/431 |
| 2006/0058941 A1 | 3/2006 | DeKock et al. |
| 2006/0074546 A1 | 4/2006 | DeKock et al. |
| 2006/0080034 A1 | 4/2006 | Hayashi |
| 2006/0229802 A1 | 10/2006 | Vertelney et al. |
| 2006/0265119 A1 | 11/2006 | McMahan et al. |
| 2008/0010002 A1 | 1/2008 | DeKock et al. |
| 2009/0164115 A1 | 6/2009 | Kosakowski et al. |
| 2009/0281726 A1 | 11/2009 | Byrne et al. |
| 2009/0287404 A1 | 11/2009 | DeKock et al. |
| 2009/0306881 A1* | 12/2009 | Dolgov ................ G05D 1/0246 701/28 |
| 2011/0015853 A1 | 1/2011 | DeKock et al. |
| 2011/0160986 A1* | 6/2011 | Wu ...................... G08G 1/0969 701/117 |

OTHER PUBLICATIONS

Yong et al. (Markov Random Field for Road Extraction Applications in Remote Sensing Images, 2008 (6 pages)).*

Hunter et al. (Arriving on Time: Estimating Travel time Distributions on Largfe-Scale Road Network, 2013 (9 pages)).*

Hu et al. (Road Network Extraction and Intersection Detection, 2007 (14 pages)).*

International Search Report of PCT/US14/46062 dated Nov. 13, 2014.

* cited by examiner

FAMILIARITY MODELING

BACKGROUND

Generally, vehicles can have telematics components, such as global positioning system (GPS) units. GPS technology can be integrated with computers and mobile communications in an automotive navigation system. For example, a GPS device can determine a location for the GPS device and record corresponding location data at an interval. The recorded location data can be stored within the GPS device or transmitted to a third party, such as a computer or a server.

SUMMARY

This summary is provided to introduce a selection of concepts in a simplified form that are described below in the detailed description. This summary is not intended to be an extensive overview of the claimed subject matter, identify key factors or essential features of the claimed subject matter, nor is it intended to be used to limit the scope of the claimed subject matter.

One or more embodiments of techniques or systems for modeling familiarity for a traveler are provided herein. Familiarity evidence for a traveler, such as a driver of a vehicle is generally indicative of a level of familiarity the traveler has with an area, road segment, city, route, traffic patterns, construction patterns, time dependent information associated therewith, etc. In one or more embodiments, familiarity evidence can be received as global positioning system (GPS) data. As an example, the GPS data may be collected from one or more sources, such as a telematics unit or component on a vehicle or a mobile device. Often, a driver can travel to a location, along a route, a city, a neighborhood, a geographical area, etc. As such, familiarity evidence can include one or more familiarity scores for such locations, routes, cities, neighborhoods, geographical areas, road segments, etc. A number of visits the traveler has made to a location can be used as a factor when determining a familiarity score. In this way, familiarity data for a traveler can be compiled, indicating locations or routes a traveler has visited and how familiar the traveler may be with these locations or routes.

In one or more embodiments, one or more familiarity models can be generated based on the familiarity evidence or GPS data associated with a traveler. A familiarity model can include one or more predicted familiarity scores. These predicted familiarity scores can be determined for locations, areas, road segments not included in the familiarity evidence. In other words, familiarity of untraveled areas of a map can be inferred from the GPS data or the familiarity evidence. Familiarity scores can be extended or extrapolated across intersections, along roads, by road name, neighborhood, or across other features. For example, if a driver travels on a segment of Main Street and also travels on a segment of Butterfield Drive, an inference can be drawn that the driver may be familiar with the intersection of Main and Butterfield, even when the driver has not been observed at that intersection. In this way, the intersection of Main and Butterfield can be assigned a predicted familiarity score. In one or more embodiments, one or more of the familiarity models can be generated using a graph distance model, one or more kernels (e.g., Gaussian, etc.), one or more Markov random fields (MRFs), etc.

In one or more embodiments, driving directions from an origin location to a destination location can be provided based on one or more of the familiarity models. For example, if a familiarity model indicates that a traveler is familiar with a portion of a route, more succinct, broader, or higher level driving directions may be provided. In other embodiments, a route from an origin location to a destination location can be selected or generated based on one or more of the familiarity models. In other words, a first route may be selected for a traveler over a second route because one or more of the familiarity models predicts that the traveler is more familiar with the first route. In one or more embodiments, an energy bar or a fuel level indicator can be adjusted based on one or more of the familiarity models. That is, if a traveler is heading from a familiar area to an unfamiliar area, the fuel level indicator of the vehicle can be configured to display a lower fuel level or energy level than estimated. This may be done to encourage a driver or traveler to fill up on fuel or recharge the vehicle prior to exploring the unfamiliar area.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
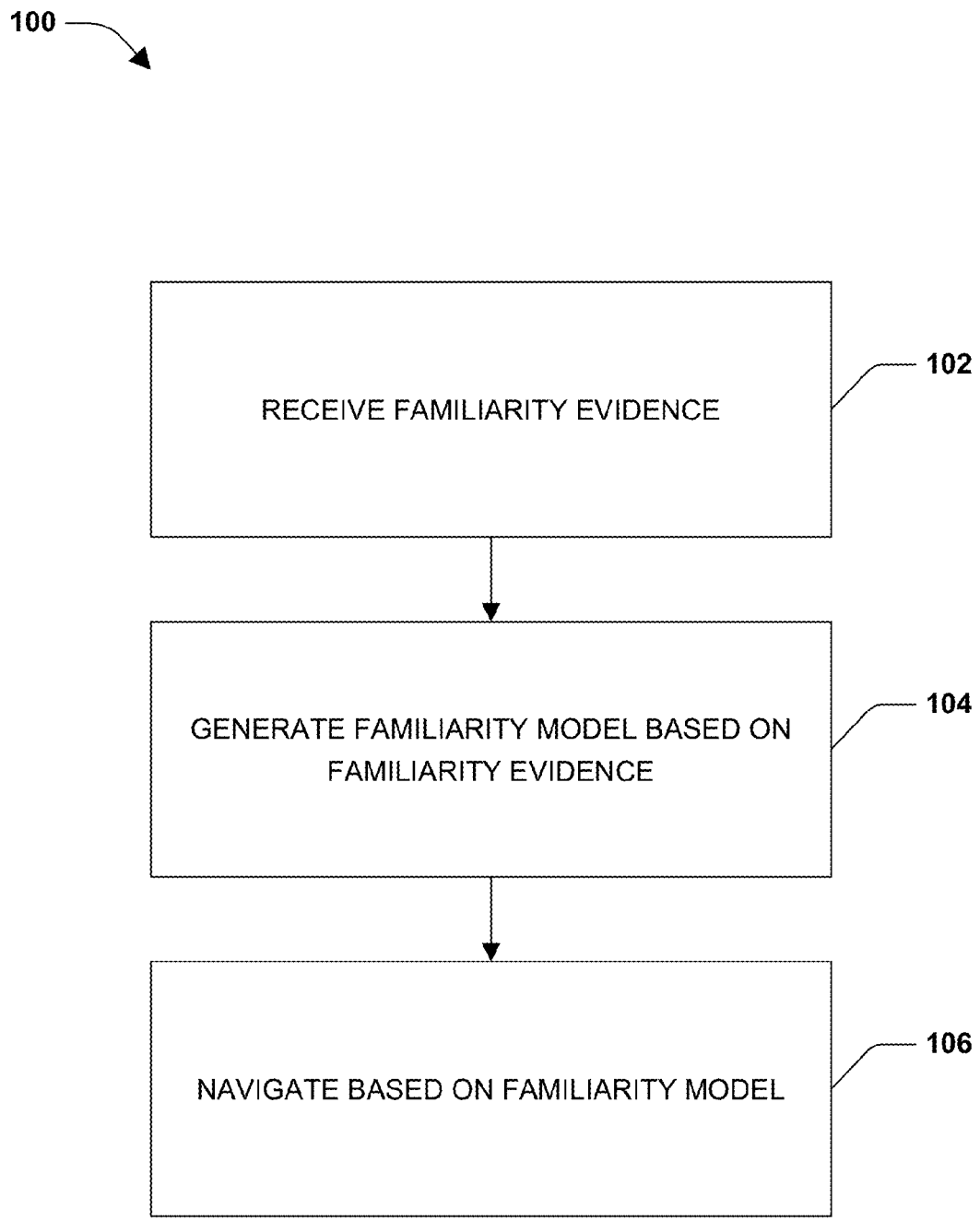
FIG. 1 is an illustration of an example flow diagram of a method for modeling familiarity, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 6:
FIG. 6 is an illustration of an example graphical representation of a familiarity model, according to one or more embodiments.

For one or more of the figures herein, one or more boundaries, such as boundary 610 of FIG. 6, for example, are drawn with different heights, widths, perimeters, aspect ratios, shapes, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but can encompass a portion of one or more other components as well.

FIG. 1 is an illustration of an example flow diagram of a method 100 for modeling familiarity, according to one or more embodiments. In some scenarios when a traveler is driving a vehicle, interruptions, such as those from a navigation unit may not be desirable. For example, when a driver has navigation enabled, the driver may not desire for the navigation unit to reroute to a destination when he or she stops for gas. Similarly, when a driver is in a home neighborhood, directions may not be necessary.

In one or more embodiments, one or more familiarity models can be generated or calculated. These familiarity models may be used to augment navigation. At 102, familiarity evidence can be received. Familiarity evidence may be indicative a travel pattern or historical travel data for a traveler, such as a global positioning system (GPS) trace, for example. This familiarity evidence can be used to build a familiarity model that provides insight as to how familiar the traveler may be with portions of the GPS trace. For example, a driver may be more familiar with areas or road segments traveled on daily then road segments visited merely once.

At 104, one or more familiarity models may be generated based on the familiarity evidence received at 102. Effectively, a familiarity model can be a prediction of how familiar a traveler is or may be with an area, one or more locations, routes, traffic patterns, road segments, intersections, etc. A variety of familiarity models can be used, as will be described in FIG. 2.

At 106, navigation can be based on one or more of the familiarity models. A familiarity model can be indicative of how predictively familiar a traveler may be with a road segment, intersection, route, or location. As an example, navigation instructions may be omitted when a driver is in a familiar area. As another example, when two routes are available from a first location to a second location, a more familiar route of the two routes may be selected.

In one or more embodiments, navigation instructions can be provided and behavior of a driver or traveler can be observed. Behavior can include one or more choices made by a traveler. The familiarity model can be modified or updated based on observed traveler behavior, such as observed driving behavior. In other words, observed driving behavior can be incorporated into the familiarity model, thereby facilitating feedback. For example, choices made by a driver, as well as deviations, mistakes, etc. could be used to adjust the threshold for omitting directions or combining two or more sets of directions to be more high level. That is, if a driver fails to follow a high level direction, a threshold associated with those directions could be lowered, and more detailed directions provided. In this way, the familiarity model or a generation system used to generate driving directions can be tuned.

Figure 2:
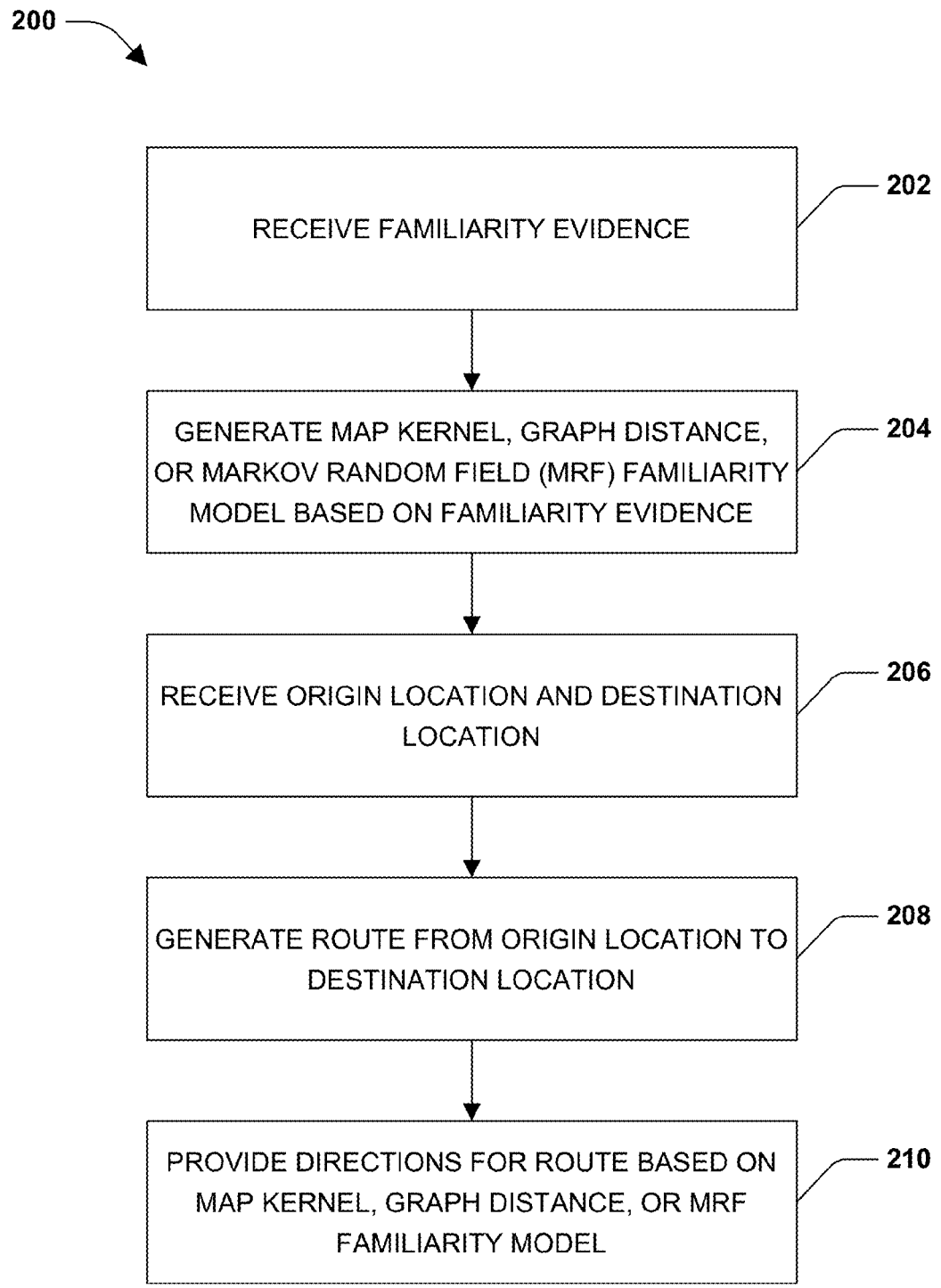
FIG. 2 is an illustration of an example flow diagram of a method for modeling familiarity, according to one or more embodiments.

FIG. 2 is an illustration of an example flow diagram of a method 200 for modeling familiarity, according to one or more embodiments. At 202, familiarity evidence can be received. Familiarity evidence can be data that is indicative of how often a traveler travels along one or more road segments or passes through one or more intersections. In one or more embodiments, familiarity evidence can be recorded from a global positioning system (GPS) unit and include GPS data, such as a latitude, a longitude, a date, and a timestamp. That is, a GPS unit or a telematics component can be configured to record GPS data, such as a position of a traveler and a corresponding time when the traveler is at that position. The GPS unit or the telematics component can be setup to record the GPS data at an interval, such as once every second, for example.

As an example, a GPS trace can be indicative of a traveler's familiarity with a set of one or more road segments. Additionally, this familiarity can be based on a frequency of travel associated with one or more of the road segments. For example, if a driver travels on a first road or road segment on a daily basis, it can be determined that the driver may be more familiar with the first road segment than a second road segment that the driver has only traveled on once.

In one or more embodiments, familiarity evidence can include additional data or information relevant to a traveler's familiarity with a road segment or road. For example, familiarity evidence can include whether infotainment was active while a traveler was travelling along a road segment or through an intersection. That is, if a driver has entertainment or may potentially be distracted, such as by a radio, etc., the level of familiarity of the driver may be affected by the distraction. In other words, if a driver is travelling along a road or road segment, and has the stereo at a high volume, it may be inferred that the driver or traveler is less familiar with that road segment than if the stereo was off, for example.

In one or more embodiments, familiarity evidence can be collected by detecting one or more passengers in a vehicle. For example, if a traveler or driver has an infant in the vehicle, the traveler may not be as focused on a surrounding driving environment. Accordingly, a familiarity score for a corresponding road segment may be lower than a scenario where no passengers are in the vehicle. In other embodiments, familiarity evidence can include time of day in relation to sunrise and sunset. For example, a traveler may typically travel along a route during the daytime, when sunlight is more abundant. This may mean that the traveler is more familiar with the route during the daytime and less familiar with the route at nighttime. Familiarity evidence or familiarity scores can be assigned accordingly. Additionally, familiarity evidence can include one or more road characteristics as will be described with reference to FIG. 2, for example.

Similarly, familiarity evidence can include the presence of other passengers, (e.g., indicated by seat belt buckled, weight sensors, etc.). Further, familiarity evidence can include a traveler response to a survey, such as, "How familiar are you with the intersection of Main Street and First Avenue, on a scale from 1 to 5?" In this way, familiarity evidence can be gathered, where the familiarity evidence can include aspects relating to potential distractions for a traveler. In other embodiments, the familiarity evidence can include how recently a traveler passed through an intersection or along a road segment. That is, if a traveler has not traveled along a road for years, the traveler may not be as familiar with that road as other roads traveled on daily, for example. According to one or more aspects, familiarity evidence can include a profile of a traveler, familiarity with alternate routes, historical driving information, route choices, historical departure times, driving speeds along of the traveler along the route, etc.

In one or more embodiments, a collection component can be configured to receive familiarity evidence associated with one or more road segments of a map and one or more intersections of the map. One or more intersections of the map can be connected by one or more of the road segments of the map. In this way, familiarity evidence for a traveler can be collected, where the familiarity evidence can indicate whether or not a traveler has traveled on one or more of the road segments, whether or not the traveler has passed through one or more of the intersections, how frequently the traveler has traveled on one or more of the road segments, how frequently the traveler has passed through one or more of the intersections, etc. Accordingly, familiarity evidence can be indicative of a frequency of how often or how frequently the traveler travels along one or more of the road segments or passes through one or more of the intersections.

Familiarity evidence can be received from one or more sources, and can have a variety of formats. For example, familiarity evidence can include GPS data or a GPS trace. This GPS data can be received from a GPS unit, a navigation device of a vehicle, a telematics component, a mobile device equipped with GPS functionality, such as a cell phone, etc., for example. In one or more embodiments, the GPS data or GPS trace can be compiled or consolidated from multiple sources. For example, a GPS trace could include GPS data from a navigation device of a vehicle driven by a traveler. Further, the GPS trace could include GPS data from a mobile device or cell phone of the traveler. In other words, a vehicle of the traveler could be configured to record GPS data and a mobile device could also record GPS data, thereby providing enhanced familiarity coverage or familiarity evidence (e.g., rather than merely relying on an on-board or in-vehicle GPS unit).

In one or more embodiments, the familiarity evidence can be used to build an evidence model. The evidence model can represent one or more trips taken by a traveler. For example, a trip can include travel along one or more road segments or through one or more intersections. This means that familiarity evidence, GPS data, a GPS trace, a GPS reading, etc. can be associated or mapped to a road segment or an intersection. In one or more embodiments, this can be done using a hidden Markov model (HMM). A trip can be determined in a variety of mechanisms. For example, a trip may be determined when a vehicle shuts off. As another example, an excursion may be counted as a trip when the vehicle remains stationary longer than a threshold period of time, such as five minutes.

Additionally, the evidence model can include one or more familiarity scores for one or more of the trips or one or more familiarity scores for one or more road segments from a trip, a GPS trace, or the familiarity evidence. In other words, the familiarity evidence can be segmented into one or more trips and scored accordingly. This enables an assessment (e.g., a familiarity score) to be made on a road segment to determine how familiar a traveler is with that road segment based on a travel history of a traveler.

One or more familiarity scores can be determined for a trip or a road segment which was part of a trip. In one or more embodiments, a score component can be configured to assign one or more familiarity scores to one or more road segments or one or more intersections based on GPS data or the familiarity evidence. In this way, familiarity evidence, GPS data, or a GPS trace can be transformed into an evidence model which includes one or more familiarity scores. These familiarity scores can be used as a baseline for building one or more familiarity models. In other words, the evidence model may be used for baseline scoring when calculating one or more of the familiarity models. In one or more embodiments, the familiarity evidence can include one or more familiarity scores for one or more of the road segments or one or more of the intersections.

At 204 one or more familiarity models can be generated. One or more of the familiarity models can be generated based on the familiarity evidence or an associated evidence model. A familiarity model component can be configured to generate one or more familiarity models based on familiarity evidence or an associated evidence model. A familiarity model can be a model for predicting or estimating a familiarity a traveler may have with one or more road segments or one or more intersections from an area (e.g., which may correspond to a map). In other words, a familiarity model may be based on a history or log of locations where a traveler has traveled, such as a GPS trace. That is, GPS data or a GPS trace can be used in conjunction with one or more algorithms to create the familiarity model by adjusting one or more parameters associated with the familiarity model according to one or more utility metrics. When one or more of these parameters are calculated, waypoints along a route may be provided to the model to determine one or more familiarity scores for the route or portions of the route. Additionally, the familiarity model may be indicative of a predicted familiarity of areas, road segments, intersections, etc. near portions of the GPS trace. For example, if a traveler travels along Main Street on a frequent basis and also travels along First Avenue frequently, a familiarity model may determine that the traveler is familiar with the intersection of Main Street and First Avenue even when a GPS trace does not indicate that the traveler has been to that intersection.

A familiarity model can be used to represent familiarity with varying degrees of granularity. For example, a familiarity score or predicted familiarity score can be assigned to a location, a landmark, such as a restaurant, an area, a road, a road segment, a city, a neighborhood, a route, etc. In other words, familiarity scores or predicted familiarity scores can be associated or assigned to zero dimensional objects (e.g., such as a location, a restaurant, a landmark, etc.), one dimensional objects (e.g., such as a road segment, highway, street, boulevard, route, etc.), or two dimensional objects (e.g., such as an area, township, city, etc.) on a map, for example. As such, if a technique, such as assigning a predicted familiarity score, is described with reference to a route, a portion of a route, one or more road segments along a route, etc., the technique may be applied in other embodiments to assign a predicted familiarity score to a location or an area, for example. Similarly, a technique described with reference to a road segment may be performed with an intersection or vice versa.

In one or more embodiments, one or more of the familiarity models includes one or more predicted familiarity scores for one or more road segments or one or more intersections. That is, a familiarity model can be a predictive model that may be indicative of how familiar a traveler may be with one or more road segments or one or more intersections of an area or a corresponding map of the area, for example. These familiarity models, road segments, intersections, etc. may correspond to real life locations or routes or locations on a map, for example.

Familiarity models can be based on distances, graph distances, kernels (e.g., Gaussian kernels), probabilistic models, probabilistic graph models, road network graphs (RNGs), Markov random fields (MRFs), conditional random fields (CRFs), etc. In this way one or more familiarity models can be generated. For example, a map kernel familiarity model, a graph distance familiarity model, a MRF familiarity model, or one or more additional familiarity models can be generated based on familiarity evidence or an associated evidence model. The map kernel familiarity model, the graph distance familiarity model, or the Markov random field (MRF) familiarity model can include one or more predicted familiarity scores for one or more of road segments or one or more of intersections.

For example, a road network graph (RNG) can be used to create a familiarity model. A RNG can be a graph or representation (e.g., mathematical, etc.) of a road network which includes one or more nodes and one or more edges. One or more of the nodes or vertices of the RNG can represent one or more intersections while one or more of the edges of the RNG can represent one or more road segments. Effectively, a RNG can be an ordered pair including a set vertices or nodes associated with a set of edges or lines. These edges or lines can be connected between two vertices to form the RNG.

One or more aspects of a RNG can be used to determine familiarity. For example, analyzing the familiarity evidence enables one to determine where a traveler has been. In other words, familiarity evidence can be indicative of whether or not a traveler has visited a road segment and how often, frequently, or recently the traveler traveled along the road segment. In one or more embodiments, a predicted familiarity score can be determined for one or more familiarity models. For example, if a GPS trace or familiarity evidence indicates that a traveler has traveled along a first road segment, but not along a second road segment, a predicted familiarity score can be determined based on a distance between the first road segment and the second road segment.

As used herein, 'distance' can include a distance measured by driving distance, number of nodes from edge to another edge, number of edges from one node to another node, driving time, travel time, number of intersections, number of qualified intersections (e.g., non-trivial intersections, major intersections, intersections associated with a traffic pattern, threshold, number of lanes, etc.). For example, a predicted familiarity score can be determined based on a number of nodes or intersections between a first road segment or first road and a second road segment or second road. As another example, a predicted familiarity score can be determined based on a number of intersections where one or more roads of the intersection have four or more lanes.

In one or more embodiments, one or more familiarity models or predicted familiarity scores of a familiarity model can be generated based on familiarity evidence, GPS data (e.g., from a mobile device, navigation unit of a vehicle, etc.), a GPS trace, etc. associated with a traveler. In other words, familiarity can be modeled based on GPS data of a traveler. In one or more embodiments, a familiarity model component can be configured to generate one or more familiarity models for a map or area based on familiarity evidence. In this way, one or more familiarity models for the map or area can be generated.

Additionally, one or more of the familiarity models of an area or predicted familiarity scores for corresponding road segments or intersections can be generated based on one or more characteristics of a road or road segment. A traveler's familiarity with a road segment or an intersection can be related to a variety of factors. As an example, the relationship between familiarities for orthogonal road segments may differ from the familiarity for a continuous road segment or for segments where an angle between two road segments is not substantially orthogonal. In other words, if Main Street zigzags, passes through a traffic circle, etc., familiarity scores may be determined or estimated more conservatively or using a different basis because a traveler may be more likely to be confused when following a road that is not continuous or linear, for example.

In another example, intersections can be binned or categorized based on an angle between road segments of the intersection. Further, a predicted familiarity score or familiarity model including such an intersection could be based on the binning or categorization of the intersection. For example, an intersection could fall into one of three categories where the angle between road segments may be less than 60°, between 60° and 120°, or between 120° and 180°. A familiarity score for this intersection or one of the road segments of the intersection could be based on the angle between the road segments or the corresponding categorization.

In one or more embodiments, a familiarity model and one or more corresponding predicted familiarity scores or an evidence model and one or more familiarity scores can be generated based on one or more of these road characteristics. For example, a familiarity model can be based on a proximity of a road segment or an intersection to another road segment or another intersection, administrative boundaries (e.g., same county, same road, same block, same neighborhood, etc.), a shape or curvature of a road or road segment, a road name, traffic patterns, speed limits, number of lanes, traffic level, a type of road (e.g., highway, drive, avenue, boulevard, local, state, federal designation), number of roads or ways intersecting at an intersection or junction, number of businesses along a road or road segment, etc.

Further, a familiarity model or an evidence model can be generated based on other factors related to a traveler or a vehicle. For example, a familiarity model can update familiarity scores or predicted familiarity scores based on a trend in GPS data or new GPS data collected from the traveler. Conversely, the familiarity model can be updated or generated based on one or more temporal aspects related to the GPS data. In other words, as a portion of a GPS trace gets older or more time passes, the corresponding familiarity model or predicted familiarity scores for that portion of the GPS trace may be adjusted accordingly. For example, if a traveler has a routine route to work, but switches from a first job to a second job, and doesn't revisit the old routine route to the first job, familiarity with the route to the first job may decline over a period of time. That is, the traveler may not be as familiar with the route to the first job as time passes and new businesses are constructed along the route, etc.

In one or more embodiments, familiarity models or evidence models can be based on a frequency a traveler visits a location, such as an intersection. The frequency can be indicative of how often the traveler travels along a route or one or more road segments associated with the route. Additionally, familiarity models can be tailored to a profile of a traveler. For example, age and gender can be used to adjust a familiarity model, among other factors. That is, a younger traveler or driver may be less familiar with an area than a middle aged driver who has more experience. However, an elderly driver may be less familiar with the area than the middle aged driver due to a decline in memory, for example.

A familiarity model or corresponding familiarity scores can be based on a current time. For example, if familiarity evidence indicates that a driver travels on a road segment frequently, an evidence model built from the familiarity evidence can assign that road segment a high familiarity score. Further the familiarity evidence may include timestamps indicative of a time of day or day of the week that the driver traveled on the road segment. As an example, the familiarity evidence may indicate that the driver drove on the road segment between 11:00 AM and 1:00 PM. These time stamps associated with the familiarity evidence or evidence model can be used to modify one or more of the familiarity scores. That is, a familiarity model or corresponding familiarity scores can fluctuate based on a time of day, day of the week, sunrise, sunset, amount of light out, visibility based on weather conditions, etc. In other words, a familiarity model may indicate that a driver is more familiar with a road segment during times corresponding to the familiarity evidence or evidence model for that road segment. For example, if a driver consistently takes a highway at night, a familiarity model generated based on that familiarity evidence may favor familiarity at night.

Traveler familiarity with one or more alternative routes, a number of shortcuts taken by the traveler, historical route choices, etc. can also be used to build a familiarity model. For example, in a scenario where a driver is observed taking an alternate route when a typical or direct route has a high traffic pattern or the driver takes the alternate route at 'rush hour', one or more road segments, corresponding neighborhoods, etc. can be assigned a higher predicted familiarity score than a second driver who uses the direct route on a more regular basis.

In one or more embodiments, a familiarity model can include baseline familiarity data, similar to familiarity evidence or a corresponding evidence model. That is, an area, intersection, or road segment where a traveler has traveled may be scored as familiar, while areas, intersection, or road segments where the traveler has not traveled may be scored as less familiar. Further, familiarity may be a function of travel frequency. In other words, the more frequent or recent a traveler has traveled on a roadway or road segment, the higher the familiarity the traveler may have and a predicted familiarity score can be assigned accordingly.

According to one or more aspects, graph based familiarity models can be used. As mentioned, a road network graph (RNG) can be generated where one or more nodes of the RNG represent one or more intersections and one or more edges of the RNG represent one or more road segments. Elements of the RNG, such as nodes or edges can be associated with one or more attributes, and a graph based familiarity model can be based on these aspects accordingly. For example, an edge connecting a first node and a second node can be associated with a distance, speed limits, topological data, etc. The distance can be indicative of a driving distance between the first node and the second node or a driving time between the first node and the second node. Further, one or more familiarity scores for the familiarity model can be determined based on this information.

As an example, if the driver is mildly familiar with the first node (e.g., intersection) and the second node is a long distance away, the second node may be assigned a low predicted familiarity score. Conversely, if the second node is a short distance from the first node, the edge and the second node may be assigned a similar predicted familiarity score as the first node. In other words, familiarity can be predictively scored based on distance from a nearest node or nearest edge of a GPS trace where a traveler has traveled. That is, familiarity can be inversely proportional to the distance from a nearest point on a GPS trace where a traveler has traveled. Distance can be measured in number of node, number of edges, number of intersections, based on qualifications, driving time, meters, feet, etc. Additionally, familiarity may be proportional to a number of visits to that nearest point.

In one or more embodiments, a familiarity model may be based on map kernels, distance, familiarity evidence, frequency of visits, etc. As an example, a map kernel can be an abstract object on a map that is indicative of evidence of familiarity over a group of locations. These kernels can be derived from map data or other designations, such as a municipality boundary, etc. A predicted familiarity score may taper relative to a map kernel as distance increases from the map kernel. The tapering can be controlled or tuned based on training data, feedback, a survey, profiling of travelers, etc.

As an example, an intersection of a first road and a second road that is located in a downtown area of a city can include an intersection kernel, a first road kernel, a second road kernel, a downtown kernel, a city kernel, etc. When familiarity evidence indicates that a traveler has visited this intersection, a familiarity level, familiarity score, etc. for these corresponding kernels may be increased and familiarity for surrounding areas can be determined based on familiarity scores associated with the kernels and a distance of a surrounding area from one or more of the kernels. In one or more embodiments, familiarity can be calculated as a sum of evidence from the respective kernels.

In one or more embodiments a familiarity model can be based on a Markov random field (MRF) associated with a road network or map. A MRF based familiarity model is a model that can represent a joint probability distribution over graph structured data or random variables. That is, a MRF familiarity model can be used to represent correlations between variables connected by a network. Here, a MRF familiarity model can be used to predict a familiarity level a traveler has with an area of a map. In other words, familiarity information can be propagated from familiarity evidence or GPS data to a map or corresponding database, for example. A MRF familiarity model can be based on a road network graph (RNG), according to one or more embodiments. Accordingly, a RNG can be generated, where the RNG includes one or more RNG nodes corresponding to one or more intersections of a map and one or more RNG edges corresponding to one or more road segments of the map. Elements of a RNG, such as nodes or edges, can be associated with coordinates, latitudes, longitudes, distances, speed limits, random variables over a domain, etc.

The MRF familiarity model can be based on the RNG such that one or more potential functions are defined over elements of a clique. A clique can be a set of nodes such that there is an edge between every two pairs of nodes (e.g., such as a triangle). A clique of a MRF can correspond to an intersection or a node in the RNG. In this way, familiarity can be correlated for road segments of a road network which meet at an intersection. In one or more embodiments, a familiarity model component can be configured to generate one or more of the potential functions over one or more MRF nodes of a clique or one or more MRF edges of a clique. In other words, one or more potential functions can be generated for one or more cliques associated with the MRF familiarity model. Potential functions can be generated for a variety of RNG elements or aspects, such as intersections, roads, neighborhoods, or other map objects, for example.

According to one or more aspects, when nodes of a clique are assigned differing familiarity scores or familiarity random variables, the MRF familiarity model can associate the respective familiarity scores, thereby pulling them closer together. In this scenario, the familiarity model component can be configured to adjust one or more of the familiarity models based on one or more of the potential functions. For example, the familiarity model component can be configured to adjust assignments to one or more road segments sharing a common intersection, where the road segments have a difference in familiarity scores greater than a threshold.

In one or more embodiments, a MRF graph can be generated based on a RNG. As mentioned, a RNG can include one or more RNG nodes and one or more RNG edges, where the RNG nodes can represent intersections and the RNG edges can represent road segments. Similarly, a MRF graph can include one or more MRF nodes and one or more MRF edges connecting one or more of the MRF nodes. Here, a MRF graph can be derived from the RNG graph. For example, one or more of the MRF nodes can correspond to one or more of the RNG edges of the RNG and one or more MRF edges can be formed between two RNG edges of the road network graph sharing a common RNG node. Stated another way, a MRF graph can a line graph where RNG edges of the RNG are MRF nodes and MRF edges are formed for the MRF graph between two nodes of the MRF graph when corresponding RNG edges are adjacent such that they share a common RNG node. In this way, a MRF graph can be generated by connecting RNG edges incident at a same RNG intersection.

According to one or more aspects, one or more additional nodes can be created for a MRF graph or a RNG. For example, one or more road name nodes can be created, where a road name node is a node that represents a road name. The familiarity model component can be configured to create one or more of the road name nodes for a MRF graph. In one or more embodiments, nodes sharing the same road name can be connected to the road name node. Further, the familiarity model component can be configured to define one or more potential functions for a clique including one or more road name nodes to express a correlation or relationship between one or more route segment which share the same road name. In this way, an additional node can correspond to a clique in a line graph, as will be described in FIG. 5 (e.g., neighborhood node N). In one or more embodiments, one or more observation nodes can be created, where an observation node can be indicative of a number of times a clique or a node was visited by a traveler. In one or more embodiments, a familiarity model can be weighted based on one or more factors, such as independent parameters, etc.

In one or more embodiments, a weighted ensemble familiarity model can be generated based on one or more familiarity models. The weighted ensemble familiarity model can include a graph based familiarity model, a map kernel familiarity model, a Markov random field (MRF) familiarity model, etc. The weighted ensemble familiarity model can be a weighted linear combination of one or more of the respective familiarity models. As an example, a model including the MRF familiarity model and the map kernel familiarity model can be weighted at 0.6 and 0.4, respectively. Here, this means that the MRF familiarity model can be used for 60% of the weight for familiarity modeling and the map kernel familiarity model can be used for 40% of the weight. Weights for a linear combination can be tuned using training data, to a traveler, etc.

One or more familiarity models can be used to facilitate navigation. When turn-by-turn directions are provided for a route, one or more directions for the route can be based on a familiarity model, such as a map kernel familiarity model, a graph distance familiarity model, or a MRF familiarity model. For example, when a predicted familiarity score for a familiarity model indicates that a traveler is substantially familiar with an area or a road segment along a route, directions for the area or road segment may be omitted from navigation, combined with other navigation directions, or phrased in a different manner.

At 206, an origin location and a destination location can be received. The origin location can be a location determined from a GPS unit or navigation unit, such as a telematics component of a vehicle. The destination location may be received from a traveler via an input component of the vehicle or the telematics component. For example, a telematics component can be configured to determine a current location for a vehicle. The method can include generating a route from the origin location to the destination location at 208. In one or more embodiments, the route from the origin location to the destination location can be received, such as from a third party server, for example. A route can include one or more route segments corresponding to one or more road segments of a map. That is, a road segment can be a portion of a route. In other words, one or more of the route segments can correspond to one or more of the road segments along the route. Additionally, the route may include one or more sets of directions for one or more of the route segments.

In one or more embodiments, a familiarity model can be used to calculate a predicted familiarity score for a route, one or more route segments of the route, or one or more corresponding road segments. As an example, predicted familiarity scores for road segments or route segments along a route can be averaged to determine a predicted familiarity score for the route.

At 210, directions for the route can be provided based on a map kernel familiarity model, a graph based familiarity model, such as a graph distance familiarity model, a MRF familiarity model, or other familiarity models. One or more landmarks along the route can be identified. For example, familiarity evidence or a corresponding evidence model can be used to determine a familiarity level a traveler has with a landmark or a location nearby. These landmarks can be incorporated into one or more of the directions for the route. For example, a direction may tell a driver, "Turn right at the red barn" when the evidence model or familiarity evidence indicates that the driver is substantially familiar with the red barn or a location associated with the red barn.

In one or more embodiments, providing directions for the route 210 can include generating a sub-route based on one or more familiarity models. A sub-route can include one or more of the directions mapped to a macro state. In other words, driving directions of the route can be adapted to be more succinct, understandable, or personalized by omitting, combining, or rewording directions using a familiarity model. In this way, directions can be provided based on a familiarity level or familiarity model that a traveler has with a portion of a route, such as a road segment. What this means is that one or more portions of a route or corresponding directions can be presented to a traveler at a high level or with high level directions.

High level directions can be based on natural language, trained from humans, etc. For example, when a traveler is unfamiliar with an area, turn by turn directions can include, "Turn right at Main Street", "turn left at First Avenue", "turn left on 71-North". When the traveler is familiar with the area, directions for that portion of the route may include, "Take 71-North using Main Street". Here, an order of directions can be reversed or adjusted when a traveler may be familiar with an area, as indicated by a familiarity model. That is, in the unfamiliar scenario, the traveler is presented with "Turn right at Main Street" prior to "turn left on 71-North", while in the familiar scenario, the traveler is presented with 71-North before Main Street.

In one or more embodiments, one or more of the familiarity models or directions for a route can be tuned. For example, after a set of high level directions are provided, such as at 210, behavior of a traveler or driver can be observed. If the driver appears to hesitate, fails to follow one or more of the high level directions according to an anticipated reaction, an associated threshold for one or more of the familiarity models can be adjusted. In this way, observed driving behavior can be incorporated in to one or more of the familiarity models or a system or component associated with generating one or more of the directions, navigation, instructions, etc., thereby facilitating 'tuning'.

Combination of macro-states and generation of high level directions can be probabilistically by a conditional random field (CRF) and can depend on features other than familiarity, such as timing and fluency of generation, saliency of landmarks, road network topology, etc. A cognition component can be configured to provide one or more directions from an origin location to a destination location along a route based on the route and one or more familiarity models. Further the cognition component can be configured to combine, adjust, reword, or omit directions according to predicted familiarity scores or associated familiarity models. In this way, familiarity modeling can clarify navigation, enhance GPS efficiency, mitigate interruptions, etc., among other things.

Figure 3:
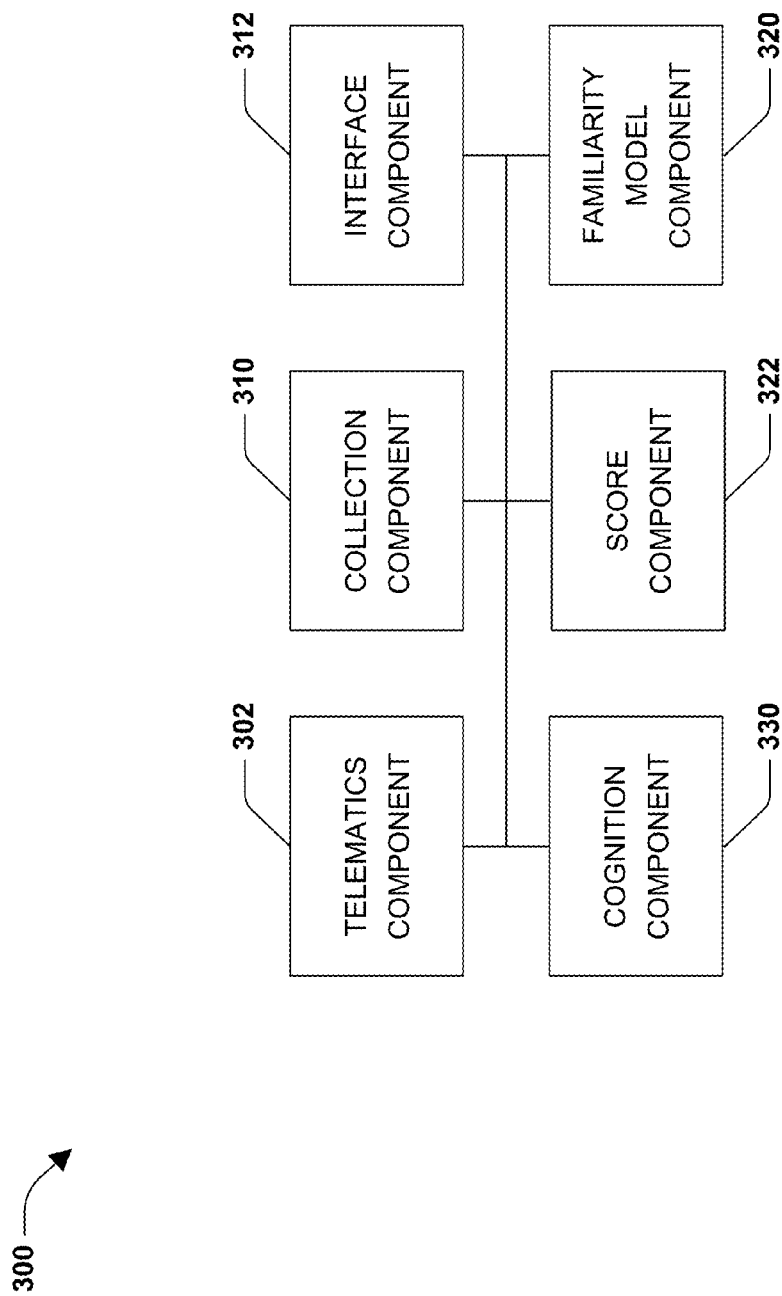
FIG. 3 is an illustration of an example component diagram of a system for modeling familiarity, according to one or more embodiments.

FIG. 3 is an illustration of an example component diagram of a system 300 for modeling familiarity, according to one or more embodiments. The system 300 of FIG. 3 can include a telematics component 302, a collection component 310, an interface component 312, a cognition component 330, a score component 322, and a familiarity model component 320.

The telematics component 302 can be configured to gather GPS data or a GPS trace and transform the GPS trace into a set of familiarity evidence associated with a traveler. Additionally, the interface component 312 can be configured to receive additional GPS data from additional sources, such as a mobile device, social networks, etc. The telematics component 302 can collect the GPS data over a period of time, such as three months. The score component 322 can be configured to assign or determine one or more familiarity scores for one or more road segments or intersections based on the familiarity evidence. The collection component 310 can be configured to receive familiarity evidence, which can include one or more familiarity scores for one or more road segments where the traveler has driven or traveled.

The familiarity model component 320 can be configured to generate one or more familiarity models for a map based on familiarity evidence or an evidence model. One or more of the familiarity models can be based on one or more kernels, one or more graph distances, or one or more Markov random fields (MRFs). The score component 322 can be configured to assign or determine one or more predicted familiarity scores for one or more road segments or intersections based on one or more of the familiarity models. The familiarity model can comprise one or more of the predicted familiarity scores for one or more road segments, one or more of the intersections, or one or more other features of a map.

The telematics component 302 can be configured to receive an origin location and a destination location and generate or receive a route from the origin location to the destination location. The route can be along one or more road segments and include one or more corresponding route segments. In one or more embodiments, the cognition component 330 can be configured to provide one or more directions from the origin location to the destination location based on the route and one or more of the familiarity models. As an example, the cognition component 330 can be configured to restrict or omit directions along a portion of a route. That is, if a roadway is long, such as Interstate-77, directions may be provided for unfamiliar portions and not for familiar portions of I-77.

The cognition component 330 can be configured to provide broad directions for familiar areas, such as, "Head towards Michael's house", where Michael may be a relative, acquaintance, or a contact in a linked or associated address book. In this way, one or more contacts can be incorporated into directions for a route. When a familiarity model indicates an area is a predicted familiar area, multiple directions may be given in series, or in advance, rather than on a turn by turn basis, for example. In one or more embodiments, the cognition component 330 can instruct a driver to head towards a familiar landmark and create a deviation accordingly, prior to reaching the landmark.

According to one or more aspects, the cognition component 330 can be configured to mitigate interruptions by providing instructions in familiar areas when no conversation or infotainment is detected. That is, a detection component (not shown) can be configured to detect conversation, such as based on a noise level, etc. When the telematics component 302 receives a current location of a vehicle (e.g., GPS coordinates or GPS data), the current location of the vehicle can be cross referenced with a corresponding location or road segment in one or more familiarity models. If a familiarity model indicates that the traveler or driver is generally familiar with the area, the cognition component 330 may omit, combine, reword, adjust, etc. directions associated with road segments in the area when conversation is detected, for example. In this way, interruptions can be mitigated.

In one or more embodiments, the cognition component 330 may omit directions when a traveler is traveling in a direction similar to a direction provided by the route. As an example, when a driver stops to fuel up at a gas station, the cognition component 330 can be configured to mitigate re-routing for the telematics component 302. Similarly, when the telematics component 302 indicates that a driver is in a familiar area, GPS usage can be mitigated. In other words, GPS data can be collected at a longer or larger interval in familiar areas, thereby mitigating power consumption. In other embodiments, routes may be selected based on familiarity. Often, multiple routes between an origin location and a destination location are available, so the cognition component 330 may select a route based on a driver or traveler's familiarity with the route as a whole, such as based on an average of predicted familiarity scores or familiarity scores along road segments of the route.

The interface component 312 can be configured to prompt a traveler for feedback related to directions for a road segment, and adjust the predicted familiarity score for a corresponding familiarity model accordingly. For example, feedback may be received that can be indicative of a traveler's perception of his or her own familiarity score with a road segment, city, area, location, etc. In other words, a traveler reported familiarity score can be received, reported, and compared to a corresponding predicted familiarity score in a familiarity model. The reported familiarity score may replace the predicted familiarity score, and the familiarity model may be adjusted accordingly. Feedback can include attributes or characteristics related to a traveler, such as age, gender, make and model of a vehicle, driving habits, etc. Different familiarity models for different drivers can be stored or profiled to characterize one or more trends among travelers.

A familiarity model can be used to impact a fuel gauge or energy meter, a display, etc. to mitigate range anxiety. For example, a traveler may generally be more comfortable on a full tank of gas, fully charged battery, fuel source, etc. when traveling in an unfamiliar area. The familiarity model component 320 can be configured to promote a traveler to recharge or refuel by exaggerating or adjusting a fuel level or energy level based on familiarity. For example, when a traveler is en route from a familiar area to an unfamiliar area, prior to reaching an unfamiliar road segment, the interface component 312 can be configured to have a fuel gauge or energy meter display a lower than actual reading, thereby encouraging a driver to recharge or refuel the vehicle prior to driving in the unfamiliar area. In this way, a display buffer can be created to mitigate range anxiety for a traveler in an unfamiliar area.

Figure 4:
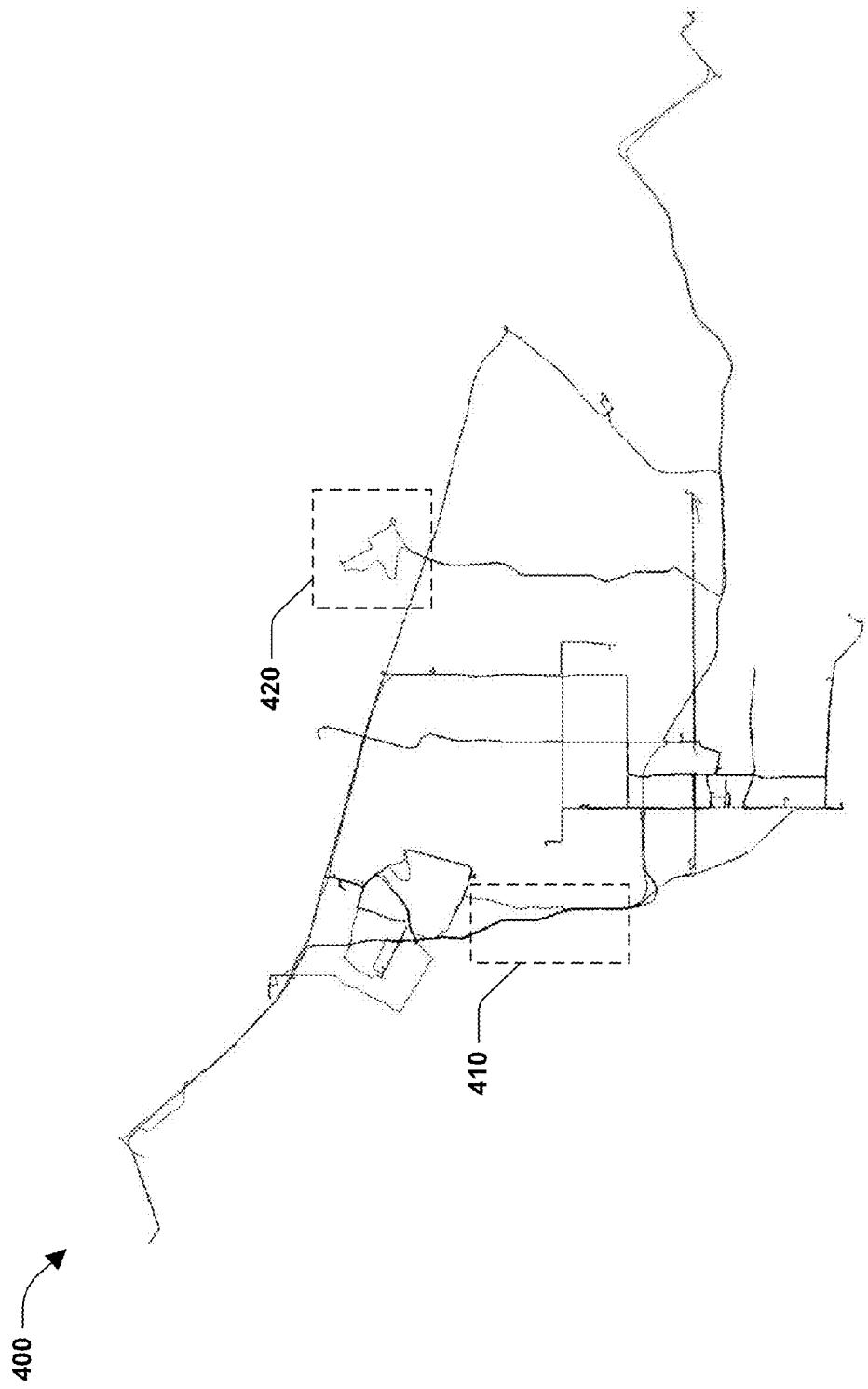
FIG. 4 is an illustration of an example global positioning system (GPS) trace, according to one or more embodiments.

FIG. 4 is an illustration of an example global positioning system (GPS) trace 400, according to one or more embodiments. The GPS trace 400 of FIG. 4 can be utilized as familiarity evidence for a traveler. Effectively, the GPS trace 400 can be used to determine where a traveler has traveled (e.g., with a GPS unit). As an example, the traveler associated with the GPS trace 400 of FIG. 4 may have traveled along area 410 more frequently than area 420, as indicated by the darker shade drawn at area 410. As a result of this, the traveler or driver may be assigned a familiarity score for area 410, where the familiarity score for area 410 may be higher than a familiarity score for area 420 in one or more embodiments.

Figure 5:
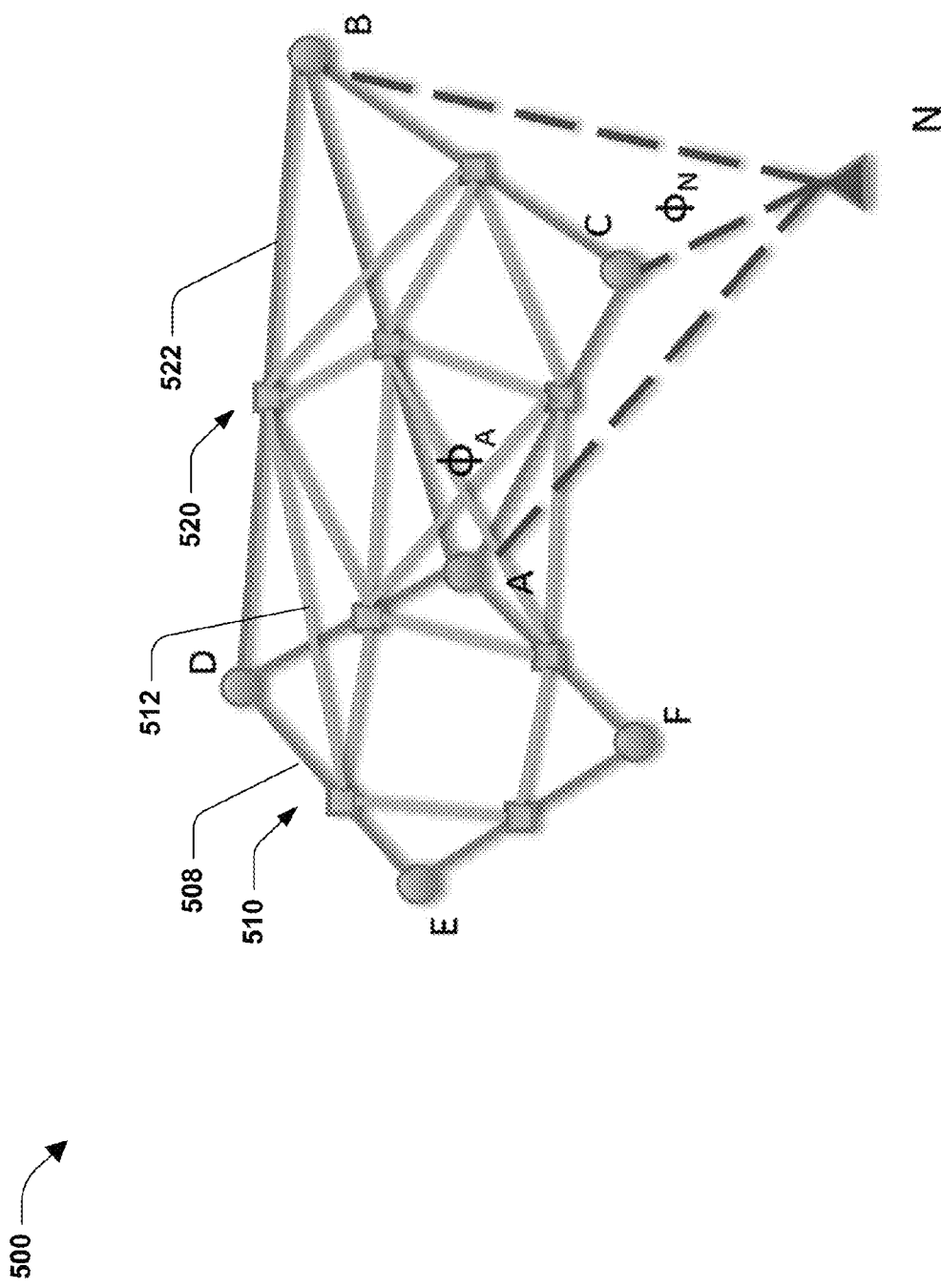
FIG. 5 is an illustration of an example road network graph (RNG) and a corresponding Markov random field (MRF) graph, according to one or more embodiments.

FIG. 5 is an illustration of an example road network graph (RNG) and a corresponding Markov random field (MRF) graph 500, according to one or more embodiments. A MRF graph 500 is constructed in FIG. 5 for an example road network. Nodes A, B, C, D, E, and F can represent one or more intersections of one or more roads of the road network from the RNG. Edges between nodes A, B, C, D, E, and F can represent one or more roads within the road network. For example, edge 508 represents a road from intersection E to intersection D and edge 522 represents a road from intersection D to intersection B. By connecting node N to nodes A, B, and C, node N can be used to represent a neighborhood N including A, B, and C.

In one or more embodiments, a MRF graph 500 can be constructed by connecting edges of the RNG that are incident at the same intersection. In other words, edges of the RNG (made up of nodes A, B, C, D, E, F, and corresponding edges) can form one or more of the nodes of the MRF graph, such as nodes 510 and 520. Further, these nodes for the MRF graph can be connected when the corresponding edges of the RNG share a common node. For example, edge 508 of the RNG (e.g., node 510 of the MRF graph) can be connected to edge 522 (e.g., node 520 of the MRF graph) of the RNG via MRF edge 512 because road ED shares node D with road DB. FIG. 5 also illustrates one or more potential functions for the MRF graph, such as a potential function $\phi_A$ for intersection A and a potential function $\phi_N$ for neighborhood N.

FIG. 6 is an illustration of an example graphical representation 600 of a familiarity model, according to one or more embodiments. The graphical representation 600 includes a map with one or more roads and one or more intersections. Additionally, the graphical representation 600 of the familiarity model can include one or more areas with corresponding familiarity scores. Here, in this example, area 610 has a higher familiarity score than area 620, as indicated by the darker shading of area 610.

Figure 7:
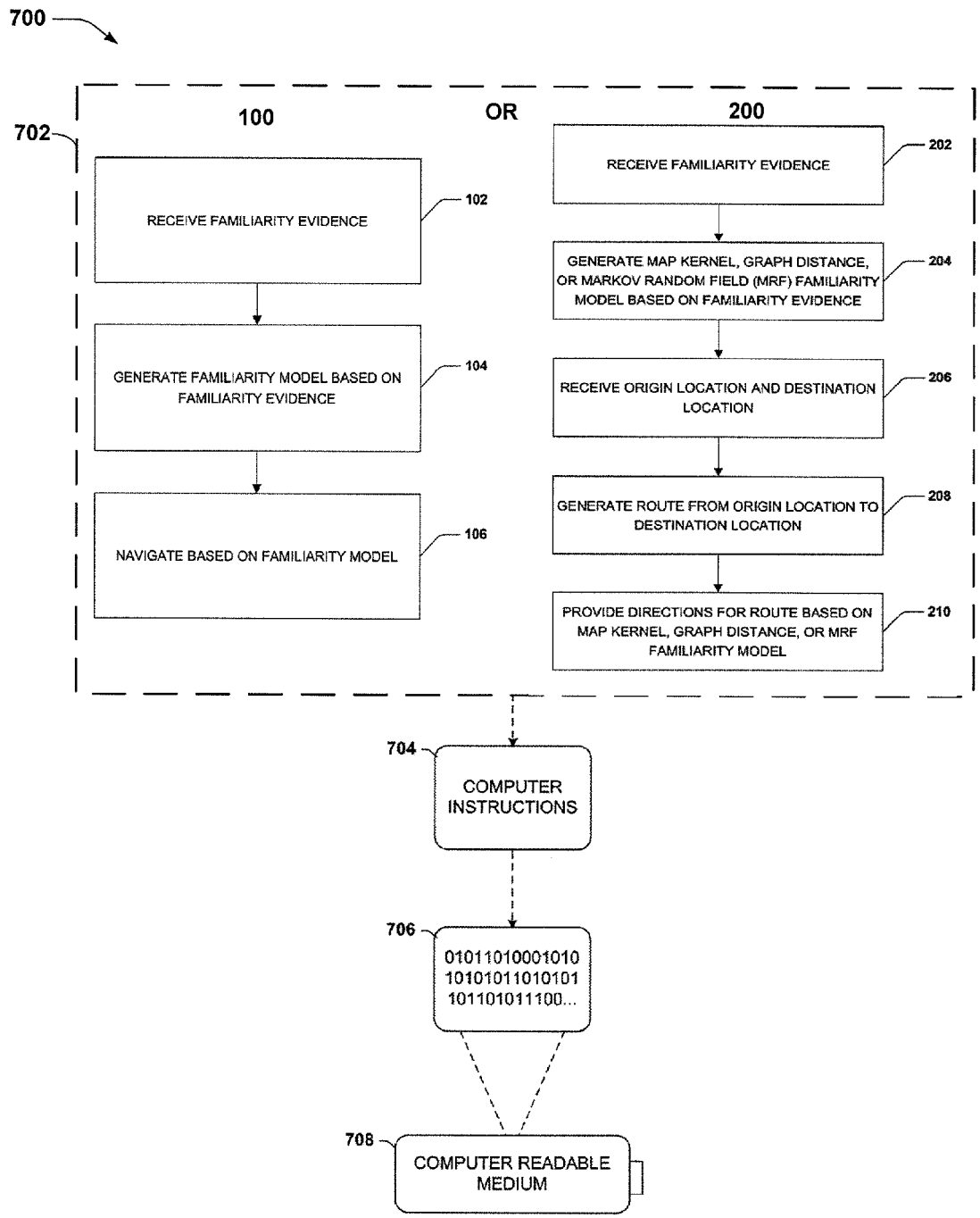
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device that is devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 are configured to perform a method 702, such as the method 100 of FIG. 1 or the method 200 of FIG. 2. In another embodiment, the processor-executable instructions 704 are configured to implement a system, such as the system 300 of FIG. 3. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
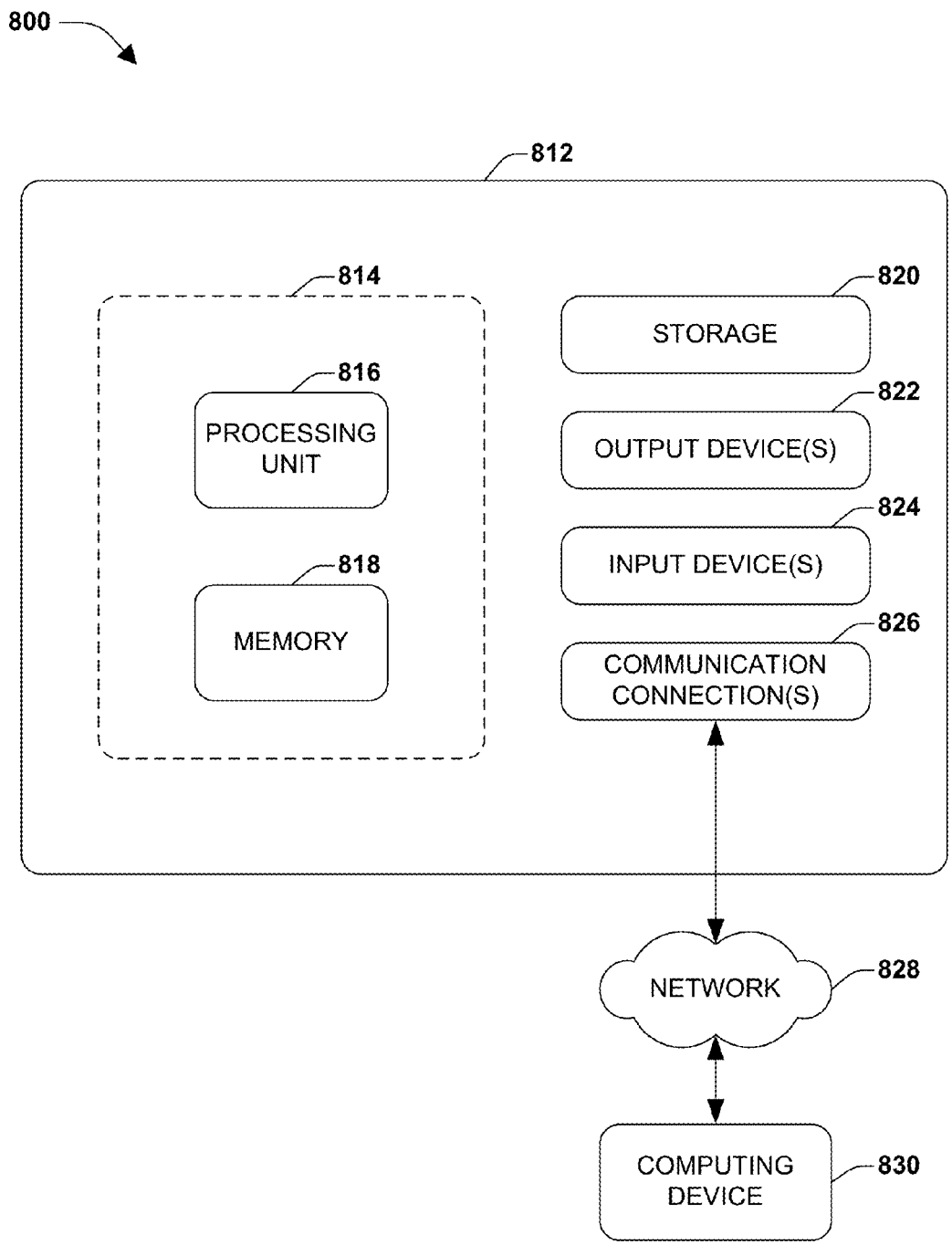
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 also includes additional storage such as removable storage or non-removable storage, including, but not limited to, magnetic storage, optical storage, and the like. Such additional storage is illustrated in FIG. 8 by storage 820. In one or more embodiments, computer readable instructions to implement one or more embodiments provided herein are in storage 820. Storage 820 also stores other computer readable instructions to implement an operating system, an application program, and the like. Computer readable instructions are loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device are also included in device 812. Input device(s) 824 and output device(s) 822 are connected to device 812 via a wired connection, wireless connection, or any combination thereof. In one or more embodiments, an input device or an output device from another computing device are used as input device(s) 824 or output device(s) 822 for computing device 812. Device 812 also includes communication connection(s) 826 to facilitate communications with one or more other devices.

An artificial intelligence (AI) component can be provided that employs probabilistic or statistical-based analysis to infer an action that a user desires to be automatically performed. As used herein, the term "infer" or "inference" generally refers to the process of reasoning about or inferring states of a system, environment, or user from observations as captured via events or data. Inference can be employed to identify a context or action, or to generate a probability distribution over states, for example. In one or more embodiments, the inference can be probabilistic. In other words, computation of a probability distribution over states of interest can be based on a consideration of data and events. Inference can also refer to techniques employed for composing higher-level events from a set of events or data. Such an inference can result in the construction of new events or actions from a set of observed events or stored event data, whether or not the events are correlated in temporal proximity, and whether the events and data come from one or several event or data sources.

One or more embodiments can employ various AI-based schemes for carrying out various aspects thereof. For example, a process can be facilitated via an automatic classifier system, which employs a classifier. A classifier can be a function that maps an input attribute vector, $x=(x1, x2, x3, x4, xn)$, to a confidence that the input belongs to a class. That is, $f(x)$=confidence (class). Such classification can employ a probabilistic or statistical-based analysis (e.g., factoring into the analysis utilities and costs) to infer an action that a user desires to be automatically performed. Further, attributes can be derived and classes can be categories or areas of interest.

A support vector machine (SVM) is an example of a classifier that can be employed. The SVM operates by finding a hypersurface in the space of possible inputs, where the hypersurface splits triggering criteria from non-triggering events. This facilitates classification for testing data that is similar, but not necessarily identical to training data. Other directed and undirected model classification approaches include, naïve Bayes, Bayesian networks, decision trees, neural networks, fuzzy logic models, probabilistic classification models, etc. These models can provide different patterns of independence when employed. Classification can include statistical regression utilized to develop models of priority or ranking.

One or more embodiments can employ classifiers that are explicitly trained (e.g., via a generic training data) or implicitly trained (e.g., via observing user behavior, receiving extrinsic information, etc.). For example, SVM's can be configured via a learning phase or a training phase within a classifier constructor and feature selection module. Thus, the classifier can be used to automatically learn and perform a number of functions.

According to one or more aspects, a method for modeling familiarity for a traveler is provided, including receiving familiarity evidence associated with one or more road segments of a map and one or more intersections of the map. One or more of the intersections can be connected via one or more of the road segments. Additionally, the familiarity evidence can include one or more familiarity scores for one or more of the road segments or one or more of the intersections. The method can include generating one or more familiarity models for the map based on the familiarity evidence. One or more of the familiarity models can be based on one or more kernels, one or more graph distances, or one or more Markov random fields (MRFs). One or more of the familiarity models can include one or more predicted familiarity scores for one or more of the road segments or one or more of the intersections.

Familiarity evidence can include global positioning system (GPS) data or a GPS trace. Additionally, familiarity evidence can be indicative of a frequency which a traveler travels along one or more of the road segments or one or more of the intersections. One of more of the graph distances can be measured by nodes, edges, travel time, or major intersections.

In one or more embodiments, the method can include generating a road network graph (RNG) including one or more RNG nodes corresponding to one or more of the intersections of the map and one or more RNG edges corresponding to one or more of the road segments of the map. Further, a MRF graph can be generated based on the road network graph.

According to one or more aspects, a system for modeling familiarity for a traveler is provided, including a collection component configured to receive familiarity evidence associated with one or more road segments of a map and one or more intersections of the map. The system can include a familiarity model component configured to generate one or more familiarity models for the map based on the familiarity evidence.

In one or more embodiments, the familiarity model component can be configured to generate a road network graph (RNG) including one or more RNG nodes corresponding to one or more of the intersections of the map and one or more RNG edges corresponding to one or more of the road segments of the map. Additionally, the familiarity model component can be configured to generate a MRF graph including one or more MRF nodes corresponding to one or more of the RNG edges of the road network graph and one or more MRF edges between two RNG edges of the road network graph sharing a common RNG node. The familiarity model component can be configured to create one or more road name nodes for the MRF graph and generate one or more potential functions over one or more of the MRF nodes of a clique or one or more of the MRF edges of the clique. One or more of the familiarity models can be adjusted by the familiarity model component based on one or more of the potential functions.

The system can include a telematics component configured to capture global positioning system (GPS) data. A score component can be configured to assign one or more of the familiarity scores to one or more of the road segments or one or more of the intersections based on the GPS data. The telematics component can be configured to receive an origin location, receive a destination location, and generate a route from the origin location to the destination location. The route can include one or more route segments corresponding to one or more of the road segments of the map. A cognition component can be configured to provide one or more directions from the origin location to the destination location based on the route and one or more of the familiarity models.

According to one or more aspects, a computer-readable storage medium including computer-executable instructions is provided, which when executed via a processing unit on a computer performs acts, including receiving familiarity evidence associated with one or more road segments of a map and one or more intersections of the map. One or more of the intersections can be connected via one or more of the road segments. The familiarity evidence can include one or more familiarity scores for one or more of the road segments or one or more of the intersections. The method can include generating a map kernel familiarity model, a graph distance familiarity model, or a Markov random field (MRF) familiarity model for the map based on the familiarity evidence. The map kernel familiarity model, the graph distance familiarity model, or the MRF familiarity model can include one or more predicted familiarity scores for one or more of the road segments or one or more of the intersections. The method can include receiving a route from an origin location to a destination location. The route can include one or more route segments corresponding to one or more of the road segments of the map. The method can include providing one or more directions for one or more of the route segments based on the map kernel familiarity model, the graph distance familiarity model, or the MRF familiarity model.

The method can include receiving feedback associated with one or more of the directions and adjusting the map kernel familiarity model, the graph distance familiarity model, or the MRF familiarity model based on the feedback. The method can include selecting the route from the origin location to the destination location based on the map kernel familiarity model, the graph distance familiarity model, or the MRF familiarity model. Additionally, the method can include generating one or more potential functions for one or more cliques associated with the MRF familiarity model.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for modeling familiarity for a traveler, comprising:
    receiving familiarity evidence associated with one or more road segments of a map and one or more intersections of the map, wherein one or more of the intersections are connected via one or more of the road segments, wherein the familiarity evidence comprises one or more familiarity scores for one or more of the road segments or one or more of the intersections;
    generating a road network graph (RNG) comprising one or more RNG nodes corresponding to one or more of the intersections of the map and one or more RNG edges corresponding to one or more of the road segments of the map;
    generating a Markov random field (MRF) graph based on the RNG by connecting the RNG edges that are incident at a same intersection to form one or more nodes of the MRF graph and connecting at least a portion of the nodes of the MRF graph when corresponding edges of the RNG share a common node; and
    generating one or more familiarity models for the map based on the familiarity evidence, wherein one or more of the familiarity models are based on the MRF graph; and
    in response to detecting a difference between familiarity scores assigned to two nodes of a clique of the MRF graph exceeding a selected threshold in one of the familiarity models based on the MRF graph, adjusting the familiarity scores assigned to the two nodes to reduce the difference, wherein the adjusting comprises setting a fuel gauge or energy meter of a vehicle driven by the traveler to read lower than the actual reading of the vehicle fuel or energy level when the traveler is driving the vehicle in an unfamiliar area,
wherein the receiving and the generating are implemented via a processing unit.

2. The method of claim 1, wherein one or more of the familiarity models are further based on one or more kernels or one or more graph distances, and one or more of the familiarity models comprise one or more predicted familiarity scores for one or more of the road segments or one or more of the intersections.

3. The method of claim 1, wherein the familiarity evidence is indicative of how frequently the traveler travels along one or more of the road segments or one or more of the intersections.

4. The method of claim 2, wherein one of more of the graph distances is measured by nodes, edges, travel time, or major intersections.

5. A system for modeling familiarity for a traveler, comprising:
a collection component configured to receive familiarity evidence associated with one or more road segments of a map and one or more intersections of the map, wherein one or more of the intersections are connected via one or more of the road segments, wherein the familiarity evidence comprises one or more familiarity scores for one or more of the road segments or one or more of the intersections; and
a familiarity model component configured to:
generate a road network graph (RNG) comprising one or more RNG nodes corresponding to one or more of the intersections of the map and one or more RNG edges corresponding to one or more of the road segments of the map;
generate a Markov random field (MRF) graph based on the RNG by connecting the RNG edges that are incident at a same intersection to form one or more nodes of the MRF graph and connecting at least a portion of the nodes of the MRF graph when corresponding edges of the RNG share a common node;
generate one or more familiarity models for the map based on the familiarity evidence, wherein one or more of the familiarity models are based on the MRF graph, wherein one or more of the familiarity models comprise one or more predicted familiarity scores for one or more of the road segments or one or more of the intersections;
in response to detecting a difference between familiarity scores assigned to two nodes of a clique of the MRF graph exceeding a selected threshold in one of the familiarity models based on the MRF graph, adjust the familiarity scores assigned to the two nodes to reduce the difference and adjust a fuel gauge or energy meter of a vehicle driven by the traveler to read lower than the actual reading of the vehicle fuel or energy level when the traveler is driving the vehicle in an unfamiliar area,
wherein the collection component or familiarity model component is implemented via a processing unit.

6. The system of claim 5, wherein one or more of the familiarity models are further based on one or more kernels or one or more graph distances, and the familiarity model component is configured to generate one or more potential functions over one or more of the MRF nodes of a clique or one or more of the MRF edges of the clique.

7. The system of claim 6, wherein one or more of the potential functions is associated with one or more aspects of the RNG.

8. The system of claim 5, further comprising:
a telematics component configured to capture global positioning system (GPS) data; and
a score component configured to assign one or more of the familiarity scores to one or more of the road segments or one or more of the intersections based on the GPS data.

9. The system of claim 8, wherein the telematics component is configured to:
receive an origin location;
receive a destination location; and
generate a route from the origin location to the destination location, wherein the route comprises one or more route segments corresponding to one or more of the road segments of the map.

10. The system of claim 9, further comprising a cognition component configured to provide one or more directions from the origin location to the destination location based on the route and one or more of the familiarity models.

11. A non-transitory computer-readable storage medium comprising computer-executable instructions, which when executed via a processing unit on a computer performs acts, comprising:
receiving familiarity evidence associated with one or more road segments of a map and one or more intersections of the map, wherein one or more of the intersections are connected via one or more of the road segments, wherein the familiarity evidence comprises one or more familiarity scores for one or more of the road segments or one or more of the intersections;
generating a road network graph (RNG) comprising one or more RNG nodes corresponding to one or more of the intersections of the map and one or more RNG edges corresponding to one or more of the road segments of the map;
generating a Markov random field (MRF) graph based on the RNG by connecting the RNG edges that are incident at a same intersection to form one or more nodes of the MRF graph and connecting at least a portion of the nodes of the MRF graph when corresponding edges of the RNG share a common node;
generating one or more familiarity models for the map based on the familiarity evidence, wherein one or more of the familiarity models are based on the MRF graph and comprise one or more predicted familiarity scores for one or more of the road segments or one or more of the intersections;
in response to detecting a difference between familiarity scores assigned to two nodes of a clique of the MRF graph exceeding a selected threshold in one of the familiarity models based on the MRF graph, adjusting the familiarity scores assigned to the two nodes to reduce the difference, wherein the adjusting comprises setting a fuel gauge or energy meter of a vehicle driven by the traveler to read lower than the actual reading of the vehicle fuel or energy level when the traveler is driving the vehicle in an unfamiliar area;
receiving a route from an origin location to a destination location, the route comprising one or more route segments corresponding to one or more of the road segments of the map; and
providing one or more directions for one or more of the route segments based on the familiarity models which are based on the MRF graph.

12. The non-transitory computer-readable storage medium of claim 11, wherein one or more of the familiarity models are further based on one or more kernels or one or more graph distances, and the method further comprises instructions for:
    receiving feedback associated with one or more of the directions; and
    adjusting the map kernel familiarity model, the graph distance familiarity model, or the MRF familiarity model based on the feedback.

13. The non-transitory computer-readable storage medium of claim 12, further comprising selecting the route from the origin location to the destination location based on the map kernel familiarity model, the graph distance familiarity model, or the MRF familiarity model.

14. The non-transitory computer-readable storage medium of claim 11, wherein the familiarity evidence comprises global positioning system (GPS) data.

15. The non-transitory computer-readable storage medium of claim 11, wherein the familiarity evidence is indicative of how frequently a traveler travels along one or more of the road segments or one or more of the intersections.

16. The non-transitory computer-readable storage medium of claim 11, further comprising generating one or more potential functions for one or more cliques associated with the MRF familiarity model.

\* \* \* \* \*